Dec. 11, 1945.    M. MALLORY    2,390,603
DEGASSER FOR INTERNAL-COMBUSTION ENGINES
Filed Aug. 1, 1944
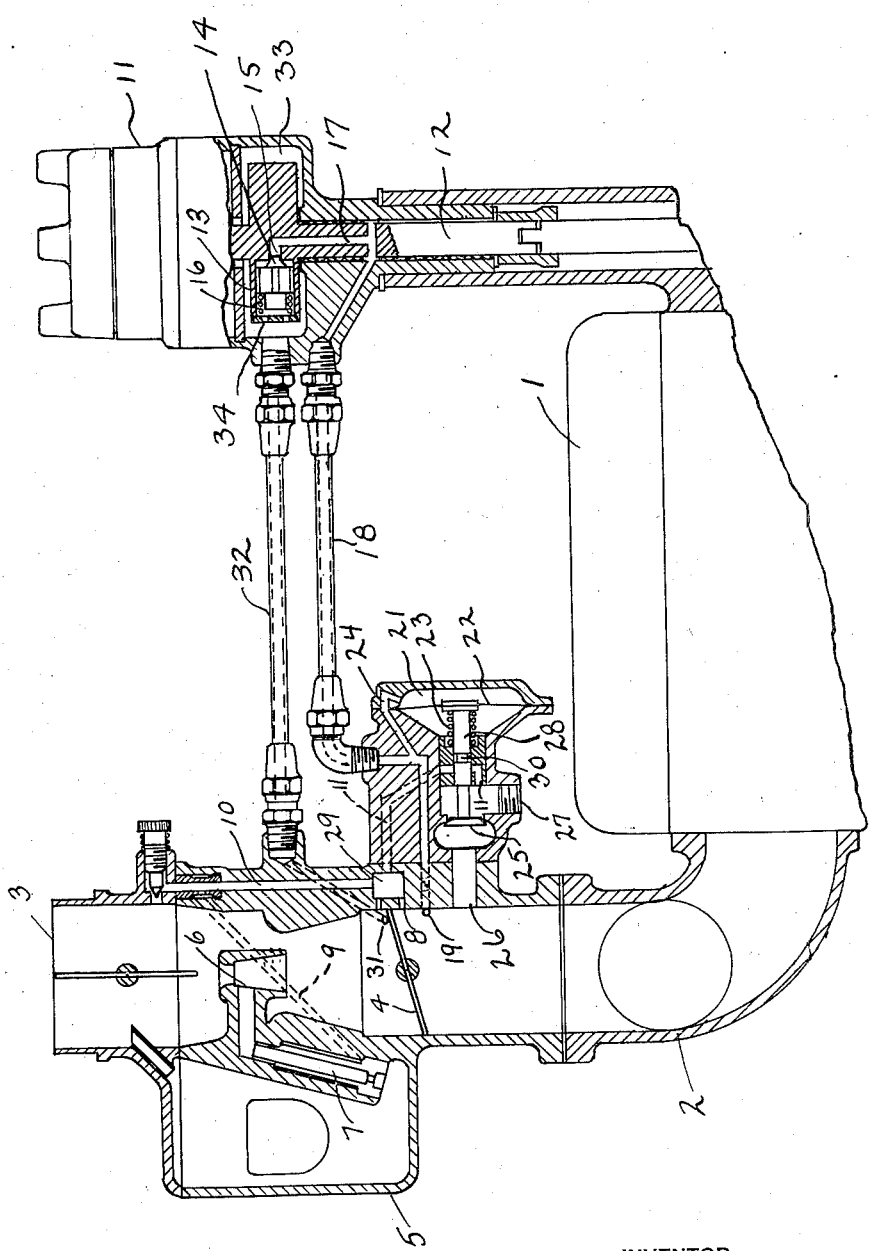
INVENTOR
MARION MALLORY
BY
ATTORNEYS Patented Dec. 11, 1945

2,390,603

UNITED STATES PATENT OFFICE 2,390,603

DEGASSER FOR INTERNAL-COMBUSTION ENGINES

Marion Mallory, Detroit, Mich.

Application August 1, 1944, Serial No. 547,611

6 Claims. (Cl. 123—103)

This invention relates to means for admitting a non-combustible charge into the manifold of an internal combustion engine when the vehicle is being decelerated on closed throttle and at the time the vehicle is driving the engine instead of the engine driving the vehicle. Such a device is commonly called a degasser for an internal combustion engine. Ordinarily under such conditions the vacuum increases tremendously in the intake manifold which makes the idle mixtures of the carburetor overly rich as well as creating excessive vacuum on top of the pistons to draw up oil. The overly rich mixture and oil vapors passing out of the exhaust are not only a waste of gasoline and oil but obnoxious odors are liberated.

It is an object of this invention to produce a device which will effectively eliminate this waste of gasoline and oil and the creation of such obnoxious odors when the engine is decelerating on closed throttle with the vehicle driving or overrunning the engine.

The figure is a sectional view showing my device in combination with a carburetor and ignition system for an internal combustion engine.

The engine is referenced 1, the intake manifold 2, the air inlet for the carburetor 3, the butterfly throttle valve 4, the fuel float bowl 5, the main fuel nozzle or jet 6 connected by passageway 7 with the float bowl, idle orifice 8 connected by passageways 9 and 10 with the float bowl, distributor 11, distributor shaft 12 driven by the engine 1, centrifugal valve housing 13, centrifugal valve 14 controlling inlet orifice 15 to passageway 17 in shaft 12, compression spring 16 tending to hold valve 14 closed, conduit 18 which places passageway 17 in communication with orifice 19 in the intake passageway on the engine side of throttle valve 4, suction chamber 21, compression spring 23, passageway 24 which connects suction chamber 21 into passageway 18, valve 25 which controls air inlet port 26 into the intake passageway, passageway 27 to atmosphere which connects with passageway 26 when valve 25 is open, valve stem 28 connected to valve 25 and to flexible diaphragm 22, compression spring 23 tends to hold valve 25 closed, passageway 11 leading from passageway 27 to chamber 29. Valve stem 28 is provided with a circumferential groove 30 so that valve stem 28 acts as a spool valve controlling the flow of air through passageway 11 from passageway 27 to chamber 29. Chamber 29 also communicates with passageways 10 and 9 and idle orifice 8. Orifice 31 is positioned in the intake passageway just above the throttle valve in idle position and communicates by means of conduit 32 with chamber 33 within the distributor housing 11 and through ports 34 with the interior of valve housing 13. Thus, valve 14 controls communication between conduit 17 and conduit 32.

The operation of the device is as follows: Supposing the engine is idling, the throttle 4 will be in position, as shown. Orifice 31 will be on the atmospheric side of the throttle and orifice 19 will be on the engine side of the throttle. However, valve 25 will not open because when the engine is running at idle or at slow speed, valve 14 is closed and there is a high vacuum existing in the suction device 21 which holds valve 25 closed. As soon as the engine speed increases above 800 R. P. M., valve 14 opens, but to increase the engine speed above 800 R. P. M., it is necessary to open valve 4 to a point that orifice 31 will be in the manifold suction and there will still be a high suction in the suction device 21, which prevents valve 25 from opening. Any time the engine is decelerated from the higher speeds or from a speed above 800 R. P. M., valve 14 will be open, but only in the event that throttle valve 4 is closed to place orifice 31 in the atmosphere will the suction device 4 be air bled through orifice 31 and lines 32 and 18 to raise the pressure in chamber 21 and permit the intake passageway suction on the engine side of valve 4 to open valve 25 and bleed down the manifold vacuum. The area of valve 25 is much smaller than the area of diaphragm 22. Therefore, when orifices 31 and 19 are both on the engine side of throttle 4, the vacuum will be as high in chamber 21 as it is at port 26 and the area of diaphragm 22, being greater than that of valve 25, the vacuum will keep valve 25 on its seat. If throttle 4 is closed, orifice 31 is then in the atmosphere and there will be practically no suction in vacuum chamber 21 when the engine is decelerating at the higher speeds. Under such conditions the suction on valve 25 will hold it open, compressing the weak spring 23. Spring 23 is only necessary in those instances where throttle 4 is opened at low speed and the vacuum drops very low in the intake passageway. A weak spring is used to keep valve 25 on its seat when the engine is pulling at wide open throttle. It can be seen that valve 25 can never open unless the throttle valve 4 is closed and the engine is running at a speed high enough to cause valve 14 to be open.

When suction device or chamber 21 is air bled, port or groove 30 registers with conduit 11, permitting air to flow through port 27 and channel 11 to chamber 29. This air bleeds the idle fuel lines 9, 10 and prevents gasoline from flowing into the engine on deceleration with throttle valve 4 closed.

Obviously the speed at which the centrifugal valve 14 will open can be varied to suit the requirements of the specific engine with which my degasser is used and the above mentioned speed of 800 R. P. M. was given for descriptive purposes only. The idle speed of the engine for illustrative purposes could be 400 R. P. M.

I claim:

1. In an internal combustion engine having an intake passageway and a throttle valve in said passageway, a port to atmosphere for said intake passageway on the engine side of said throttle valve, a second valve controlling said port, means actuated through changes of pressure in the intake passageway on the engine side of said throttle valve for imparting movement to said second valve, a conduit connecting said pressure actuated means with the intake passageway on the engine side of the throttle valve, a second conduit connecting into the intake passageway on the atmosphere side of said throttle valve and communicating with said first mentioned conduit, and means actuated in response to a predetermined engine speed for controlling communication between said first and second conduits whereby the pressure in said pressure actuated means is modified and the second valve opens and bleeds air into said intake passageway on the engine side of said throttle valve when the throttle valve is closed and the engine is operating above a predetermined speed.

2. In an internal combustion engine having an intake passageway and a throttle valve in said passageway, a port communicating with said intake passageway on the engine side of said throttle valve, a second valve controlling said port, means actuated through changes of pressure in the intake passageway on the engine side of said throttle valve for imparting movement to said second valve, an orifice on the engine side of said throttle valve, a conduit connecting said orifice with said pressure actuated means, a second orifice in the intake passageway positioned on the atmosphere side of the throttle valve when in idle position and arranged to be positioned on the engine side of the throttle valve as it moves toward open position, a conduit connecting said second orifice with said pressure actuated means, and means actuated in response to a predetermined engine speed for controlling the fluid flow through said second conduit, said means opening whenever the engine exceeds a predetermined speed whereby when the throttle is in idle position and the engine exceeds said predetermined speed the pressure rises in the pressure actuated means and the second valve opens to bleed atmospheric air through said first mentioned port into the intake passageway on the engine side of the throttle valve.

3. The combination as set forth in claim 2 including resilient means tending to close said second valve and said pressure actuated means being constructed and arranged so that a sub-atmospheric pressure in the pressure actuated means tends to close said second valve.

4. In an internal combustion engine having an intake passageway and a throttle valve in said passageway, a port on the engine side of said throttle valve, a second valve controlling said port, means actuated through changes of pressure in the intake passageway on the engine side of said throttle valve for imparting movement to said second valve, a conduit connecting said pressure actuated means with the intake passageway on the engine side of the throttle valve, an orifice in the intake passageway positioned adjacent the throttle valve and on the atmosphere side of the throttle valve when in idle position whereby as the throttle valve is opened the orifice is placed on the engine side of said throttle valve, a conduit connecting said orifice with said pressure actuated means, a centrifugally unbalanced valve rotated in accordance with the engine speed for controlling fluid flow through said second mentioned conduit, said centrifugally unbalanced valve opening whenever the engine exceeds a predetermined speed, the said pressure actuated means responding to a predetermined fall in pressure such as occurs when the engine is running above a predetermined speed with the throttle valve closed to open said second valve and bleed atmospheric air into the intake passageway, said pressure actuated means responding to a fall in pressure such as occurs when the throttle is open to place both orifices on the engine side of the throttle to thereby close said second valve and cut off the air bleed to the intake passageway.

5. The combination as set forth in claim 4 including means for closing said centrifugally unbalanced valve when the engine falls below a predetermined speed whereby the pressure actuated means will close said second valve irrespective of the position of said throttle valve.

6. The combination as set forth in claim 2 including a fuel jet operated in response to vacuum conditions in the intake passageway to feed fuel into the intake passageway, an air bleed to atmosphere for said fuel jet, and a valve controlled by said pressure actuated means for opening the air bleed to the fuel jet whenever said second valve is opened to thereby stop the flow of fuel into the intake passageway such as would otherwise occur when the throttle valve is closed and the engine is operating above a predetermined speed.

MARION MALLORY.